United States Patent [19]

Bigley et al.

[11] Patent Number: 5,772,285
[45] Date of Patent: Jun. 30, 1998

[54] HUB AND ROTOR COMBINATION

[75] Inventors: Jon A. Bigley, Canton, Mich.; Evan R. Baker, Camas, Wash.

[73] Assignee: Warn Industries, Inc., Milwaukie, Oreg.

[21] Appl. No.: 752,849

[22] Filed: Nov. 21, 1996

[51] Int. Cl.$^6$ .................................................. B60B 27/00
[52] U.S. Cl. ...................... 301/6.8; 301/105.1; 188/18 A
[58] Field of Search .......................... 301/6.1, 6.8, 105.1; 188/17, 18 R, 18 A, 218 R, 218 XL

[56] References Cited

U.S. PATENT DOCUMENTS

| 3,940,159 | 2/1976 | Pringle | 188/18 A X |
| 4,197,926 | 4/1980 | Youngdale | 188/18 A |
| 4,792,020 | 12/1988 | Okumura et al. | 301/6.8 X |

FOREIGN PATENT DOCUMENTS

| 1806566 | 5/1970 | Germany | 301/6.8 |
| 58-85701 | 5/1983 | Japan | 301/6.8 |
| 3024761 | 12/1993 | WIPO | 188/18 A |

Primary Examiner—Russell D. Stormer
Attorney, Agent, or Firm—Robert L. Harrington

[57] ABSTRACT

A hub and rotor combination for a vehicle wheel assembly including a hub having a central bore with an axis about which the combination is rotatable, a connector formed integrally with and extending radially outwardly from the hub substantially normal to the central axis, and a rotor formed integrally with an extending radially outwardly from the connector. The rotor includes a pair of first and second disk shaped ring plate portions disposed substantially normal to the central axis and spaced from each other by a plurality of radially extending, circumferentially spaced spacers to permit airflow between the rotor plate portions. The inner bore of the hub is splined to receive and engage splines on a spindle mounting.

7 Claims, 2 Drawing Sheets

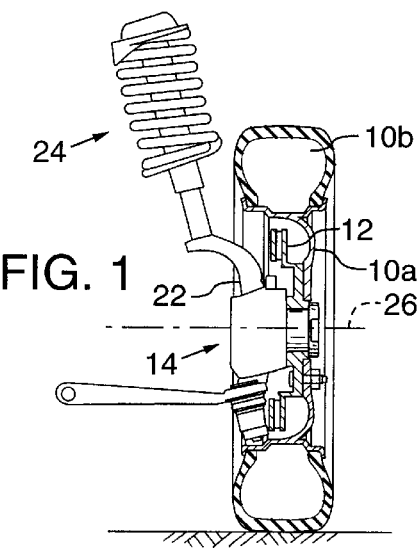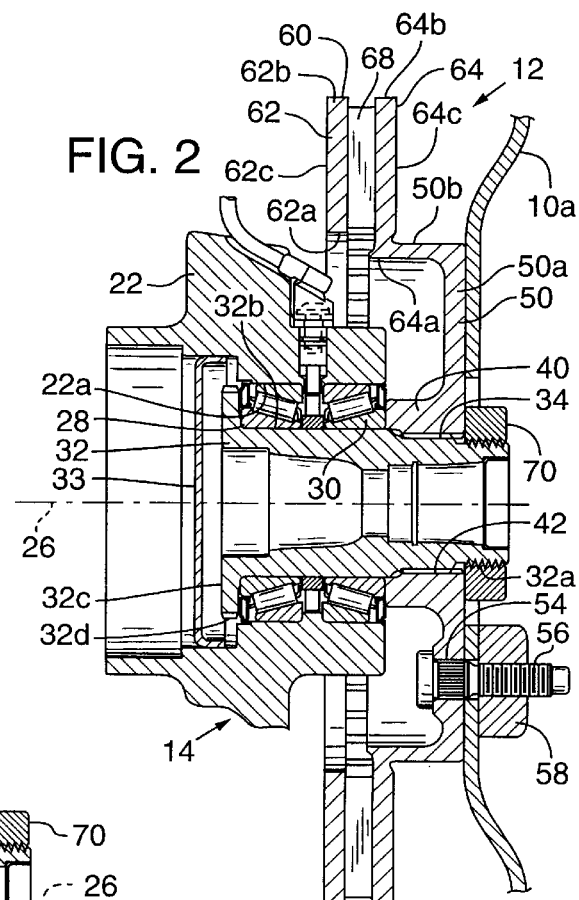

HUB AND ROTOR COMBINATION

FIELD OF THE INVENTION

This invention relates to a hub and rotor combination for a vehicle wheel assembly.

BACKGROUND OF THE INVENTION

In the past, a rotatable hub on which a vehicle wheel was mounted usually was formed separately from the rotor which would be engaged by the braking system to control rotation of the wheel. The hub and rotor were connected by securing devices, such as bolt and nut combinations which also might form the mounting for the wheel connected thereto. A problem with such prior devices was that multiple component parts were required to form the hub and rotor combination and their combined strength was limited to the strength of the connectors securing the two together. The required production of two separate component parts also militated against economies of production.

A general object of the present invention is to provide a novel monolithic, or unitary, hub and rotor combination for a vehicle wheel assembly which overcomes the disadvantages of prior devices.

More specifically, an object is to provide a hub and rotor combination which may be more economically produced than prior multiple piece combinations, yet will have strength equal to or greater than the connected strength of prior combination devices.

A further object of the invention is to provide a monolithic hub and rotor combination which permits ease of manufacture and storage, since only one part need be manufactured and stored for subsequent use.

Yet another object is to provide a novel hub and rotor combination which has internal splines which intermesh with complementary external splines on a rotating spindle mount.

BRIEF SUMMARY OF THE INVENTION

In accordance with one embodiment of the invention, a monolithic hub and rotor combination for a vehicle wheel assembly is provided including a hub having a central bore with an axis about which the combination is rotatable, a connector formed integrally with and extending radially outwardly from the hub substantially normal to the central axis, and a rotor formed integrally with and extending radially outwardly from the connector.

In an embodiment of the invention the connector includes a web portion extending radially of the hub and a ring-shaped flange portion spaced radially outwardly from the hub formed integrally with and extending substantially normal to the web portion about the hub. The rotor is joined integrally to and extends radially outwardly from the flange portion.

The rotor may be formed of a pair of disk-shaped ring plate portions disposed substantially normal to the central axis and spaced from each other by a plurality of spacers integrally formed with and extending between the plate portions to hold the plate portions in spaced relationship to permit air flow therebetween. The plate portions have substantially planer outwardly facing surfaces disposed substantially normal to the central axis. Pads of a braking system may be pressed into engagement with these surfaces to provide braking action for the wheel assembly.

The hub may be formed with internal splines which mesh with complementary external splines on a rotating spindle on which the hub and rotor combination is operatively mounted.

BRIEF DESCRIPTION OF THE DRAWINGS

FIG. 1 is a schematic view of a wheel mounting assembly for a vehicle;

FIG. 2 is an enlarged cross-sectional view through the center of the wheel mounting assembly illustrated in FIG. 1 in which a hub and rotor combination according to an embodiment of the invention is used;

FIG. 3 is an enlarged cross-sectional view of an alternate form of wheel mounting assembly in which a hub and rotor combination according to the present invention is used;

DESCRIPTION OF PREFERRED EMBODIMENT

Figure 4:
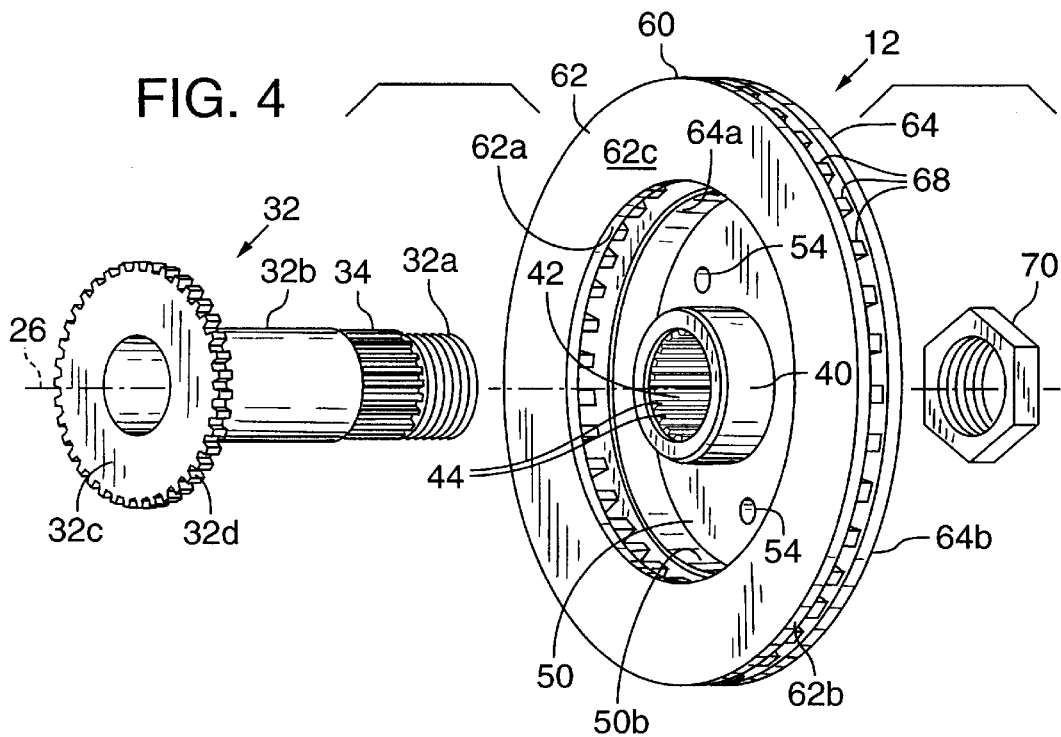
FIG. 4 is an enlarged exploded perspective view of a hub and rotor combination according to an embodiment of the invention ready for mounting on a rotatable spindle.
Figure 5:
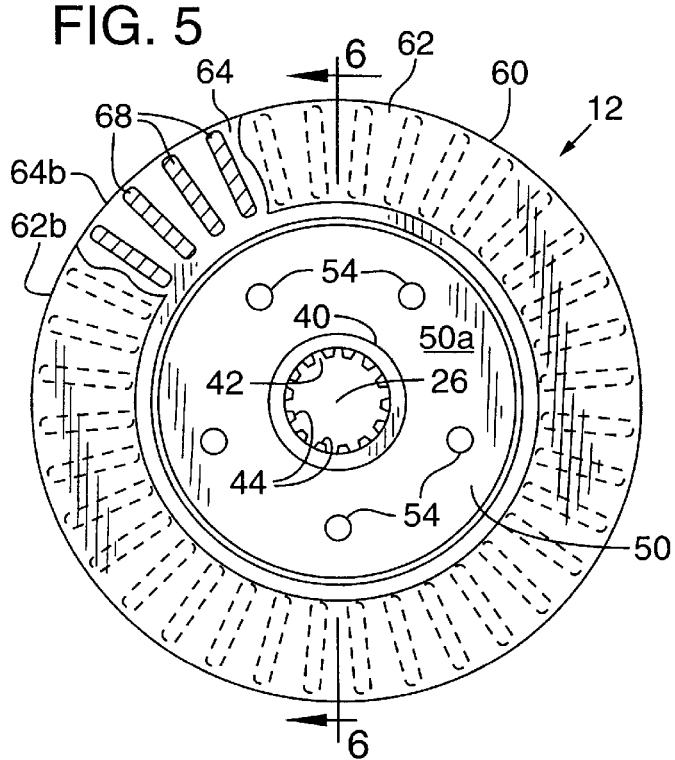
FIG. 5 is a face view of the hub and rotor combination of FIG. 4 with a portion broken away.

Referring to FIG. 1, a vehicle wheel 10 includes a metal wheel portion 10a and a tire portion 10b. Wheel 10 is secured to a wheel mounting hub and rotor combination 12 constructed according to an embodiment of the present invention. The hub and rotor combination 12 is part of a vehicle wheel-end assembly indicated generally at 14. The wheel-end assembly includes a steering knuckle, or support, 22 which is coupled, or mounted, to a vehicle frame through suspension structure 24. A horizontal axis about which the wheel and hub/rotor combination are rotatable is indicated generally at 26.

Referring to FIG. 2, knuckle 22 of the wheel-end assembly has a bore 22a extending therethrough. Mounted within bore 22a are a pair of roller-bearing assemblies 28, 30.

Rotatably mounted within bearing assemblies 28, 30 is an elongate cylindrical spindle 32 As seen in both FIGS. 2 and 4, the spindle has an outer end portion 32a, spaced outwardly from knuckle 22, with screw threads formed thereon adjacent its outer end. A series of radially projecting splines 34 are arrayed peripherally about the outer surface of the spindle adjacent but axially inwardly of the screw threads 32a. The splines extend axially of the spindle, parallel to axis 26. An intermediate, or central, portion 32b of the spindle has a cylindrical outer surface to fit within the inner races of bearing assemblies 28, 30.

The inner end portion of spindle 32 has a radially extending circular flange 32c which abuts the inner end portion of bearing assembly 28 to hold the spindle in the wheel end assembly. As best seen in FIG. 4, the outer, or peripheral, edge of inner end portion 32c has outwardly directed teeth, or engaging elements, 32d arrayed thereabout. The purpose for these teeth will be described in relation to a further embodiment of the invention to be described below. A formed seal plug 33 is press fit into the bore of knuckle 22 inwardly of spindle 32.

Referring now more particularly to the structure of the hub and rotor combination 12 and referring specifically to FIGS. 2 and 4–6, the hub and rotor combination is a monolithic, or unitary, structure having a hub, or hub portion, 40 with a central bore 42 extending therethrough. The axis of bore 42 is coincident with axis 26 when assembled with the other components in the structure. A plurality of axially extending internal splines 44 are formed in and project radially inwardly in bore 42. Splines 44 in hub 40 are configured and adapted to receive and engage the complementary external splines 34 of spindle 32 whereby splined engagement occurs between spindle 32 and hub and rotor combination 12, such that the spindle and hub and rotor combination rotate as one about axis 26.

Formed integrally with and projecting radially outwardly from one end of hub 40 is a connector, or connector portion, 50 which extends radially outwardly from the hub substantially normal to central axis 26. The connector includes a substantially planar web portion 50a extending radially outwardly of the hub and a ring-shaped flange portion 50b formed integrally with and extending substantially normally in one direction from the web portion. Hub 40 and flange 50b are each connected at one of their ends, or edges, to and extend in a common direction from web portion 50a. The web portion in the illustrated embodiment is disk shaped and has opposed, substantially planar face surfaces on its opposite sides. A vehicle wheel 10a may be mounted against one of said face surfaces as shown. The hub and flange portions of the combination extend outwardly from the web portion in a common direction opposite the face surface against which the wheel is mounted as illustrated in FIG. 2.

Web portion 50a has a plurality of apertures, or bores, 54 extending therethrough. These bores are adapted to receive connectors, such as bolt 56, which in combination with nuts as illustrated at 58 secure a wheel 10 to the hub and rotor combination.

A rotor 60 is formed integrally with and extends radially outwardly from flange portion 50b of connector 50. Flange portion sob is integrally formed with and connected at one of its end edges to the outer edge of web portion 50a. Rotor 60 is integrally formed with and connected to flange 50b at its opposite end edge.

Rotor 60 includes first and second disk shaped ring plate portions 62, 64 disposed substantially normal to central axis 26 and spaced from each other in a direction paralleling the axis. A plurality of elongate spacers 68 which extend substantially radially of the axis are formed integrally with, extend between, and hold the plate portions 62, 64 in positions spaced from each other. The spacers are spaced apart circumferentially from each other in the assembly to permit airflow between plate portions 62, 64.

Plate portions 62, 64 each have radially inwardly directed surfaces 62a, 64a respectively, and outwardly directed surfaces 62b, 64b respectively. Surfaces 62a, 62b are spaced apart radially at least a first distance, as are surfaces 64a, 64b. The spacers 68 each have a length equal to at least a major portion of said first distance.

Figure 6:
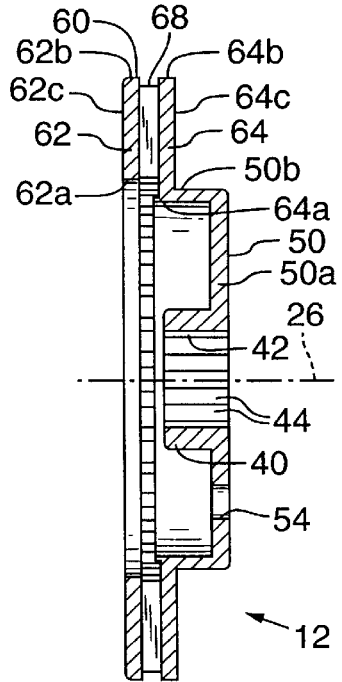
FIG. 6 is a cross-sectional view taken generally along the line 6—6 in FIG. 5.

As best seen in FIGS. 2 and 6, rotor 60 is spaced axially from web portion 50a of the connector. A portion of the rotor is aligned radially with an end section of hub 40 spaced from web 50a. It will be seen also that the opposed outwardly facing surfaces 62c, 64c of plate portions 62, 64, respectively, are substantially planar and disposed normal to the central axis. These surfaces are adapted to be frictionally engaged by brake pads of a brake system to control rotation of the rotor and hub combination and the wheel secured thereto.

A monolithic, or unitary, hub and rotor combination for a wheel assembly thus is provided. The combination has a splined central bore in its hub to engage a mounting spindle, a radially extending connector having a web portion and a flange portion projecting radially outwardly from the hub, and a rotor which is formed integrally with and extends radially outwardly from the connector portion. This provides a hub and rotor unit of substantial strength which can mount a wheel for rotation, and which has a rotor which may be engaged by the pads of a braking system for controlling rotation of the wheel.

When mounted as shown in FIG. 2 spindle 32 extends through hub 40 with splines 34, 44 in engagement. A mounting nut 70 is screwed onto the threaded outer end portion 32a of the spindle to secure the hub and rotor combination to the spindle for rotation therewith. Wheel 10 then is secured to the hub and rotor combination using bolts and nuts 56, 58.

Another embodiment of the wheel-end, or mounting, assembly is illustrated in FIG. 3. For the most part, this is similar to that illustrated in FIG. 2, in that it has a knuckle 22, bearing assemblies 28, 30, spindle 32, and a monolithic hub and rotor combination 12 as previously described. In the embodiment illustrated in FIG. 3 however an axle, or drive shaft, 72 which may be power-driven extends laterally from a central portion of the vehicle with a reduced diameter outer end section, or portion thereof, 72a rotatably supported in a hollow central portion of spindle 32. Axle 72 has a plurality of teeth, or engaging elements, 74 arrayed about its peripheral edge adjacent teeth 32d on flange 32c of spindle 32. Teeth 74 and 32d are substantially common in shape and spacing for the purpose to be described below.

A rotatable cylindrical ring gear 78, also referred to as a clutch member, has a plurality of inwardly directed axially extending engaging elements, or teeth, 80 which are sized and positioned to mesh with teeth 74 on axle 72 and teeth 32d on flange 32c of the spindle. Ring gear 78 is slidable axially in the assembly, parallel to axis 26. The ring gear is shown in a first, non-driving, position at the top of FIG. 3, in which ring gear teeth 80 are in engagement only with teeth 74 on axle 72. Teeth 80 do not engage teeth 32d in this position. The ring gear is shiftable axially to a second, or driving, position as illustrated in the lower half of FIG. 3. In this driving position teeth 80 on the ring gear concurrently engage teeth 74 and 32d to produce a driving connection between axle 72 and spindle 32 to drive wheel 10.

In the embodiment of FIG. 3 actuation to produce axial shifting of ring gear 78 is provided by a compression spring 84 and an electromagnetic actuator 86. Compression spring 84 is interposed between ring gear 78 and a shoulder on axle 72 to urge the ring gear under a selected spring biasing force to the right in FIG. 3 toward its position of driving engagement with the axle and spindle as illustrated in the lower section of FIG. 3.

Electromagnetic actuator 86 comprises an electromagnetic ring secured to knuckle 22 which may be supplied with electrical power as desired. Ring gear 78 is made of magnetically attractable material. Upon actuation of electromagnet 86, the ring gear is drawn by magnetic force to the first position illustrated in the upper portion of FIG. 3, out of engagement with teeth 32d on the spindle. The electromagnet induces a force on the ring gear toward this first, non-driving position which is greater than the force imposed thereon by spring 80, such that the spring is compressed and the ring gear is moved out of contact with the spindle. Conversely, when the electromagnet is not actuated, spring 84 urges the ring gear 78 to an interlock position as illustrated in the lower half of FIG. 3, to provide a driving connection between axle 72 and spindle 32 to drive the wheel.

Thus with the structure described in FIG. 3, a driving interconnection can be selectively provided between a power-driven axle and spindle 32, such as may be desirable in the normally non-driven wheels of a four-wheel drive vehicle. On the other hand, if such driving connection would not be necessary at any time the unpowered wheel-mounting embodiment illustrated in FIG. 2 is adequate for mounting freely rotating wheels of a two-wheel drive vehicle. Both such systems utilize and find advantage in the unique monolithic hub and rotor combination and the splined interconnection with the spindle of the present invention.

Although a preferred embodiment of the invention have been described herein, it should be apparent to those skilled in the art that variations and modifications are possible without departing from the spirit of the invention.

What is claimed is:

1. A wheel mounting system for a vehicle having a knuckle adapted to rotatable support a spindle, said system comprising
    a hub and rotor combination wherein said hub has a bore extending axially therethrough and a plurality of axially extending splines projecting radially into said bore, and
    a rotatable spindle on which said hub and rotor combination is mounted, said spindle having outer and inner ends and a mounting portion on its outer end which extends into said bore, said mounting portion having a plurality of axially extending splines projecting radially outwardly therefrom complementary with and adapted to mesh with the splines of said bore;
    said inner end of said spindle rotatably supported by the knuckle and a coupling connection at said inner end for selectively coupling the spindle to a vehicle's axle for rotatable driving the spindle and the hub and rotor combination mounted thereto.

2. The system of claim 1, wherein said spindle further has a threaded end portion adjacent said mounting portion adapted to receive a retaining nut to hold said hub and rotor combination on said spindle.

3. The system of claim 1 wherein the hub and rotor are an integral component.

4. A wheel end assembly which comprises:
    a knuckle defining a bore with inner and outer ends and a bearing assembly provided in the bore and axially fixed to the knuckle;
    a spindle rotatably mounted to the bearing assembly and extended from the inner end of the knuckle through the bore and extended beyond the outer end of the knuckle and defining thereby inner and outer ends of the spindle, said inner end of the spindle provided with a flange in abutment with the bearing assembly;
    a wheel hub rotatably fixed and axially slidable mounted to the outer end of the the spindle and placed in abutment with the bearing assembly; and
    a compression nut threadably mounted to the extreme outer end of the spindle and in engagement with the wheel hub to secure and compress the wheel hub and bearing assembly between the spindle flange and nut and to thereby mount the spindle to the knuckle.

5. A wheel end assembly as defined in claim 4 wherein a rotor is integrally formed onto the wheel hub and the combination wheel hub and rotor are provided with connecting means for connecting a wheel to the wheel hub.

6. A wheel end assembly as defined in claim 4 wherein the flange on the spindle, i.e., integrally formed with the spindle and is provided with circumferential splines;
    an axle rotatably mounted to the spindle, said axle having a flange portion with circumferential splines mated to the splines of the spindle flange, and a clutch member slidably mounted to the splines of one of the spindle flange and axle flange and slidable into engagement with the splines of the other of the spindle flange and axle flange for releasably locking the axle and spindle together.

7. A wheel end assembly as defined in claim 6 wherein an actuator is mounted to the knuckle and is engageable with the clutch member to shift the clutch member between engaged and disengaged positions.

* * * * *